United States Patent [19]

Kazuo et al.

[11] 3,895,301

[45] July 15, 1975

[54] SINGLE INDICATION SYSTEM FOR RADIO SET

[76] Inventors: Kawasaki Kazuo, No. 8-3, 2-chome, Magarimatsu, Hatano-shi, Kanagawa-ken; Arai Kazuo, No. 436, Arai, Kitahonouo, Kita-adachi-gun, Saitama-ken, both of Japan

[22] Filed: June 12, 1973

[21] Appl. No.: 369,137

[30] Foreign Application Priority Data

Nov. 21, 1972 Japan .............................. 47-133446

[52] U.S. Cl. .............................. 325/455; 340/248 R

[51] Int. Cl. .............................................. H04b 1/26

[58] Field of Search ........ 179/15 BT; 325/398, 455; 340/248 R

[56] References Cited

UNITED STATES PATENTS 3,613,007 10/1971 Endres ................................ 325/455

3,732,498 5/1973 Beckman et al. .................. 325/455

*Primary Examiner*—Benedict V. Safourek

*Attorney, Agent, or Firm*—McGlew and Tuttle

[57] ABSTRACT

Single indication system comprises a common circuit having a variable intensity illumination device connected in series therewithin and having an end connected to one terminal of a source of potential. A pair of branch circuits are connected to the opposite end of the common circuit, and each branch circuit includes a respective resistor, the two resistors having greatly different ohmic values. One branch circuit is connected to the opposite terminal of the source of potential so as to be energized whenever the radio set is switched on. The other branch circuit is connected, through a switch, to a FM multiplex receiving circuit of the radio set, so as to be energized whenever the FM multiplex receiving circuit is switched on.

7 Claims, 2 Drawing Figures

SINGLE INDICATION SYSTEM FOR RADIO SET

FIELD AND SUMMARY OF THE INVENTION

This invention relates to an illuminating and indicating system for radio set with and FM multiplex receiving circuit and more particularly to, an illumination system which is capable of indicating the inputs of both the FM multiplex receiving circuit and the radio set itself by a single illumination device which is variable in brightness.

The single indication system of the invention comprises a common circuit having a variable intensity illumination device connected therein and having one terminal connected to one terminal of the source of the electric potential. A pair of branch circuits are connected to the other end of the common circuit, and each branch circuit includes a respective resistor with the two resistors having greatly different ohmic values. One branch circuit is energized whenever the radio set is turned on, to energize the illumination device at one brighness, and the other branch circuit is energized whenever the FM multiplex receiving circuit is switched on, to energize the illumination device at a different brightness. The illumination device per se may be incorporated in a tuning indicator associated with a tuning scale of the radio set.

For an understanding of the principles of the invention, reference is made to the following description of a typical embodiment thereof as illustrated in the accompanying drawings.

DESCRIPTION OF THE PREFERRED EMBODIMENT

Figure 1:
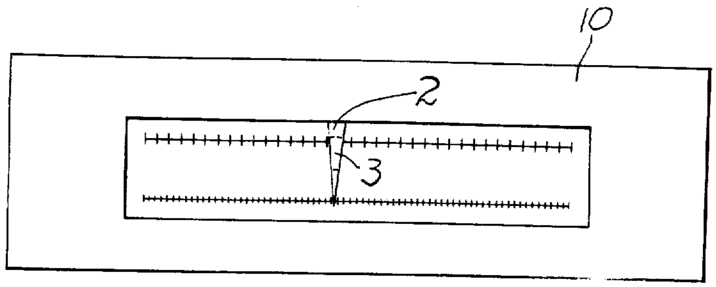
FIG. 1 is a front view of an indicator panel of a radio in accordance with the present invention.

Referring now to the drawings, the illumination system in accordance with the invention includes a common circuit 4, a light-emitting diode 3 connected in series in common circuit 4, and two aranch circuits 5 and 5' having respective resistors 6 and 6' connected in series therein; resistors 6 and 6' have greatly different ohmic or resistance values. One end of common circuit 4 is commonly connected to the two branch circuits 5 and 5' at a junction point 7, and the other end of common circuit 4 is connected to one terminal 8 of a source of electric potential. Branch circuit 5 is connected through a switch 11 to a radio set 1', and branch circuit 5' is connected through a switch 9 to an FM multiplex circuit 1. The other terminals of radio set 1' and FM multiplex circuit 1 are commonly connected, through a main on-off switch 13, to the opposite terminal 8' of the source of electric potential. Switches 9 and 11 are conjointly controlled by a knob 12, which can be rotated to a position closing switch 11 and opening switch 9 or to a position closing switch 9 and opening switch 11. The overall set is indicated at 10 in FIG. 1, and the radio set 1' portion of the overall set is that portion of set 10 which does not include the FM multiplex circuit 1.

Figure 2:
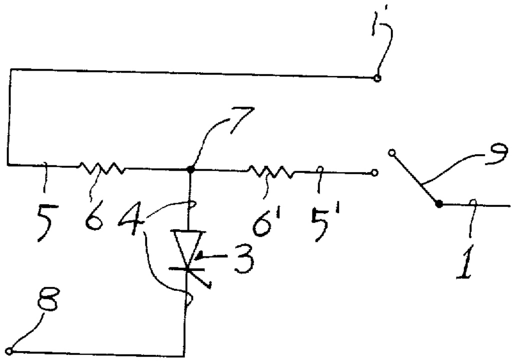
FIG. 2 is a circuit diagram of the indication circuit of the invention.

In the embodiment shown in FIG. 2, resistor 6 has a resistance value of 2.2 kiloohm (KΩ) and is connected in one branch circuit 5, and resistor 6' has a remarkably small resistance value of 330 ohm (Ω) and is connected in the other branch circuit 5'.

With switches 9 and 11 in the position shown in FIG. 2, when main on-off switch 13 of set 10 is closed, current flows from terminal 8' through switch 13', radio set 1', switch 11, circuit 5, resistor 6, junction point 7, and through common circuit 4 having the light-emitting diode 3 connected in series therein. Due to resistor 6 being included in circuit 5, circuit 5 has a very high resistance, thus energizing light-emitting diode 3, incorporated in an indicating pointer 2 associated with the radio set tuning scale on the indicator panel of the radio set to illuminate a relatively limited portion of the indicator panel in relatively pale light. Reception of medium frequency AM signals as well as FM signals is indicated by the pale illumination of the limited portion of the indicator panel.

On the other hand, when FM multiplex receiving circuit 1 is switched on by operating knob 12 to close switch 9 and open switch 11, current flows from terminal 8' through main on-off switch 13, FM multiplex circuit 1, switch 9, branch circuit 5' including resistor 6' and common circuit 4 including light-emitting diode 3 in series therein to terminal 8. Due to the very much lower ohmic value of resistor 6', branch circuit 5' has a much smaller resistance value, thus energizing light-emitting diode 3 at a higher level to illuminate the indicator panel with a relatively brighter light. Thereby, reception of FM multiplex signals through circuit 1 connected to common circuit 4 through branch circuit 5' is indicated with a sharp distinction from the other types of signals received by the radio set.

In place of light-emitting diode 3, there may be employed an electric lamp, or the like. Furthermore, these illumination devices may be colored red or the like for clear appearance of the light. The illumination device 3 may also be placed anywhere on the indicator panel.

As apparent from the above description, unlike the conventional system in which, for instance, two electric indicating lamps are employed the single indication system of the invention provides the indicator panel of radio set 10 with a single illumination, which is changeable in brightness responsive to selection of the branch circuits. Accordingly, only a relatively limited portion of the panel surface is illuminated, while the remaining portions are invisible at night and in a dark place, so that the radio listeners can enjoy the program in a more relaxed mood.

While a specific embodiment of the invention has been shown and described in detail to illustrate the application of the principles of the invention, it will be understood that the invention may be embodied otherwise without departing from such principles.

What is claimed is:

1. A single indication system for a receiver having an FM multiplex circuit for receiving FM multiplex signals, in addition to the usual radio set circuitry for receiving other signals including FM signals, said indication system comprising, in conbination, a common circuit having a first end connected to one terminal of a source of electric potential and having a second end; a single variable intensity illumination device mounted in said receiver connected in series in said common circuit between said first and second ends thereof; a pair of branch circuits having first ends commonly connected to said second end of said common circuit; respective resistances connected in series in said branch circuits, one resistance having a very high ohmic value and the other resistance having a very low ohmic value; one branch circuit having a second end selectively connectable to the other terminal of said source of potential through said usual radio set circuitry, whereby said single illuminating device is energized at a first intensity through said one branch circuit, responsive to switching on of said receiver and connection of said radio set, to receive signals other than FM multiplex signals; the other branch circuit having a second end selectively connectable to the other terminal of said source through said FM multiplex circuit; and switch means selectively operable to connect either the second end of said one branch circuit to said other terminal of said source of potential through said radio set or to connect the second end of said other branch circuit through said FM multiplex circuit to said other terminal of said source; whereby, when said second end of said other branch circuit is connected to said other terminal of said source through said FM multiplex circuit to receive FM multiplex signals, said single illumination device is energized at a second intensity through said other branch circuit.

2. A single indication system for a radio set, as claimed in claim 1, in which said resistance having a very high ohmic value is connected in series in said one branch circuit, and said resistance having said very low ohmic value is connected in series in said second branch circuit; whereby said single illumination device is illuminated at a low intensity responsive to switching on of said radio set to receive signals other than FM multiplex signals and is illuminated at a high intensity responsive to switching of said radio set to receive FM multiplex signals.

3. A single indication system, for a radio set, as claimed in claim 1, in which said single variable intensity illumination device is a light-emitting diode.

4. A single indication system for a radio set, as claimed in claim 1, in which said single variable intensity illumination device is a lamp.

5. A single indication system for a radio set, as claimed in claim 4, in which said lamp is a colored lamp.

6. A single indication system for a radio set, as claimed in claim 1, in which said radio set receiver includes a panel having a tuning scale and an indicating pointer movable along said tuning scale; said single illumination device being operable to illuminate at least a portion of said tuning scale.

7. A single indication system for a radio set, as claimed in claim 6, in which said single illumination device is mounted on said pointer for illuminating at least that portion of said tuning scale adjacent said pointer.

* * * * *